(12) United States Patent
Lee et al.

(10) Patent No.: US 9,450,808 B2
(45) Date of Patent: Sep. 20, 2016

(54) COMMUNICATIONS NETWORK

(75) Inventors: Chin Kang Lee, Singapore (SG); Yew Kwee Lew, Singapore (SG); Wei Thiam Neo, Singapore (SG); Yen Yen Michael Chia, Singapore (SG)

(73) Assignee: ST ELECTRONICS (INFO-COMM SYSTEMS) PTE LTD, Singapore (SG)

( * ) Notice: Subject to any disclaimer, the term of this patent is extended or adjusted under 35 U.S.C. 154(b) by 216 days.

(21) Appl. No.: 14/131,324

(22) PCT Filed: Jul. 8, 2011

(86) PCT No.: PCT/SG2011/000248
§ 371 (c)(1),
(2), (4) Date: Jul. 16, 2014

(87) PCT Pub. No.: WO2013/009260
PCT Pub. Date: Jan. 17, 2013

(65) Prior Publication Data
US 2014/0321261 A1    Oct. 30, 2014

(51) Int. Cl.
*H04L 12/24* (2006.01)
*H04L 12/437* (2006.01)

(52) U.S. Cl.
CPC ......... *H04L 41/0654* (2013.01); *H04L 12/437* (2013.01); *H04L 41/12* (2013.01)

(58) Field of Classification Search
CPC . H04L 12/422; H04L 12/427; H04L 12/437; H04J 3/085
See application file for complete search history.

(56) References Cited

U.S. PATENT DOCUMENTS

| | | | | |
|---|---|---|---|---|
| 4,538,264 A * | 8/1985 | Bahr | ..................... | H04L 12/437 714/4.1 |
| 4,596,982 A * | 6/1986 | Bahr | ..................... | H04L 12/437 340/2.23 |
| 6,865,149 B1 * | 3/2005 | Kalman | .................. | H04L 12/42 370/225 |
| 2005/0207348 A1 * | 9/2005 | Tsurumi | ................ | H04L 12/437 370/241 |
| 2009/0290486 A1 * | 11/2009 | Wang | .................... | H04L 12/437 370/222 |
| 2011/0095601 A1 * | 4/2011 | Johansson | ........... | H02J 13/0003 307/9.1 |
| 2012/0275785 A1 * | 11/2012 | Dasamaneni | ......... | H04L 12/437 398/45 |
| 2014/0321261 A1 * | 10/2014 | Lee | ....................... | H04L 12/437 370/216 |

FOREIGN PATENT DOCUMENTS

EP    0 531 059 A1    3/1993

OTHER PUBLICATIONS

"Cyber-Ring Ethernet Self-healing Technology," Wayback Machine, [retrieved May 6, 2016 from the internet], <URL: http://web.archive.org/web/20080907205400/http://www.icpdas.com/products/Switch/industrial/cyberring.htm> 3 pages.

(Continued)

*Primary Examiner* — Benjamin H Elliott, IV
(74) *Attorney, Agent, or Firm* — Sughrue Mion, PLLC

(57) ABSTRACT

A communications network including a plurality of communicating stations, each communicating station being connectable to two adjacent communicating stations via respective ring connections, the ring connections being arranged to define at least one communications ring interconnecting the plurality of communicating stations, the network being adapted to at least partially reconfigure the ring connections in response to detection of at least one network fault.

20 Claims, 6 Drawing Sheets

(56) References Cited

OTHER PUBLICATIONS

Yongjun, Zhang et al., "Ring Network Technology for Carrier Ethernet," ZTE Communications, 2009, No. 1, [retrieved May 6, 2016 from the internet] <URL: http://wwwen.zte.com.cn/endata/magazine/ztecommunications/2009year/no1/articles/2009003/t20090319_170881.html>, 6 pages.

"What is SDH?", Pulse, Inc., 2011, [retrieved Feb. 28, 2012 from the Internet] <URL: http://www.pulsewan.com/data101/sdh_basics.htm>, 11 pages.
"Fiber Distributed Data Interface," DocWiki, [retrieved May 6, 2016 from the Internet], <URL: http://docwiki.cisco.com/wiki/Fiber_Distributed_Data_Interface>, 13 pages.
International Search Report for PCT App. No. PCT/SG2011/000248, dated Oct. 14, 2011.

* cited by examiner

COMMUNICATIONS NETWORK

BACKGROUND OF THE INVENTION

The present invention relates to a communications network and a communicating station for use in a communications network, and in particular to a communications network using a ring topology for supporting integrated voice and data exchange with high survivability over potential equipment and/or linkage failure.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

In a typical Ethernet network supporting exchange of Internet Protocol (IP) packets for data communication, the network topology is configured in a tree structure. In the event that a closed loop is formed in the tree topology, data packets loop infinitely causing duplication of messages between two communicating stations, which can in turn lead to a reduction in available bandwidth and quality of service.

Standard protocols such as Spanning Tree Protocol (STP) and Rapid Spanning Tree Protocol (RSTP) ensure a loop-free topology to prevent bridge loops and ensuing broadcast radiation. The protocols allow a network design to include redundant links to provide automatic backup paths if an active link fail. However, the convergence time can be more than five seconds depending on the scale of the network deployment, which is undesirable in a practical situation.

SUMMARY OF THE PRESENT INVENTION

In a first broad form the present invention seeks to provide a communications network including a plurality of communicating stations, each communicating station being connectable to two adjacent communicating stations via respective ring connections, the ring connections being arranged to define at least one communications ring interconnecting the plurality of communicating stations, the network being adapted to at least partially reconfigure the ring connections in response to detection of at least one network fault.

Typically each communicating station is selectively connectable to two adjacent communicating stations via respective pairs of first and second ring connections, the first and second ring connections being arranged to define first and second communications rings interconnecting the plurality of communicating stations, the communications network being adapted to at least partially reconfigure at least one of the first and second ring connections in response to detection of at least one network fault.

Typically controllers of the plurality of communicating stations cooperate to selectively configure the network.

Typically at least one controller at least one of:
a) selects a communicating station as a master station; and,
b) selects a direction of data transfer around at least one communications ring.

Typically a master controller of a master station selectively deactivates at least one ring connection to thereby configure the network as an inline network.

Typically the master controller selectively deactivates at least one ring connection by at least one of:
a) disabling a ring port of a communicating station; and,
b) selectively controlling at least one switch of a master station.

Typically a master controller is selected by:
a) having a controller of each communicating station acquire identifiers of each other communicating station;
b) having a controller self elect as a master controller using the identifiers; and,
c) having the master controller communicate with the controller of each other communicating station to identify the master controller.

Typically at least one controller:
a) generates a configuration message the configuration message including an indication of a respective identifier;
b) transfers the configuration message to each adjacent communicating station;
c) receives configuration messages from adjacent communicating stations; and,
d) determines a network configuration using the configuration messages.

Typically for each controller:
a) if a received configuration message includes the respective identifier, the controller determines the network configuration; and,
b) if a received configuration message does not includes the respective identifier of the communicating station, the controller:
  i) adds the identifier of the communicating station to the configuration message; and,
  ii) transfers the configuration message to adjacent communicating stations.

Typically each controller:
a) periodically generates test messages; and,
b) detects a network fault using the test messages.

Typically each controller:
a) receives a test message from an other communicating station;
b) generates a response message; and,
c) transfers the response message to the other communicating station, each controller determining a network fault if a response from a communicating station is not received.

Typically each communicating station is further connected to two adjacent communicating stations via respective power distribution connections, the power distribution connections being arranged to define a power distribution ring.

Typically each communicating station includes a controller for controlling operation of the communicating station.

Typically each communicating station includes at least one switch coupled to the ring connections.

Typically each communicating station includes:
a) a first switch coupled to first ring connections; and,
b) a second switch coupled to second ring connections wherein the controller controls operation of the first and second switches.

Typically the first and second switches are selectively connectable.

Typically each communicating station includes at least two ring ports, each ring port providing connectivity for a respective pair of first and second ring connections.

Typically each ring port provides connectivity between the first and second ring connections and first and second switches respectively.

Typically each communicating station includes a number of device ports for allowing communications devices to be coupled to the communicating station, the device ports providing connectivity to at least one switch.

Typically the communications devices include at least one of:
a) a computer system;
b) a VoIP phone; and,
c) a headset.

Typically each controller is capable of transforming data packets for transmission in accordance with different communications protocols.

Typically the protocols include:
a) Ethernet protocol;
b) a wireless transmission protocol; and,
c) a serial transmission protocol; and,
d) an analog signal for audio playback.

Typically the controller includes an electronic processing device.

Typically the network includes first and second communications rings configured to operate at least one of:
a) separately;
b) independently; and,
c) as at least one back-up communications ring.

Typically the network includes first and second communications rings capable of independently transporting voice traffic and data traffic.

Typically the network includes first and second communications rings configured to operate as overlapping communications rings and provide transport media redundancy with one communications ring actively back up the other communications ring.

Typically the network includes first and second communications rings and wherein data traffic transported across one communications ring is capable of being transported across the other communications ring when configured to operate as overlapping communications rings.

Typically the network configures so that a faulty communicating station breaking the communication link does not affect the communication status between two or more other connected communicating stations.

Typically the network configures as multiple isolated networks when two or more communicating stations are faulty.

Typically the network reconfigures upon a communicating station recovering from a fault.

Typically the ring connections are Ethernet connections.

In a second broad form the present invention seeks to provide a communicating station for use in a communications network including a plurality of communicating stations provided in a ring architecture, the communicating station being selectively connectable to two adjacent communicating stations via respective ring connections, the ring connections being arranged to define at least one communications ring interconnecting the plurality of communicating stations, the communication station including:
a) a switch coupled to the ring connections; and,
b) a controller to control operation of the switch to thereby at least partially configure the ring connections in response to at least one network fault.

Typically the communication station is selectively connectable to two adjacent communicating stations via respective pairs of first and second ring connections, the first and second ring connections being arranged to define first and second communications rings interconnecting the plurality of communicating stations, the communication station including:
a) a first switch coupled to the first ring connections; and,
b) a second switch coupled to the second ring connections, wherein the controller controls operation of the first and second switches to thereby at least partially configure the first and second ring connections.

Typically each communicating station includes at least two ring ports, each ring port providing connectivity for a respective pair of first and second ring connections.

Typically each ring port provides connectivity between the first and second ring connections and the first and second switches respectively.

Typically the first and second switches are selectively connectable.

Typically the controller cooperates with controllers of the plurality of communicating stations to selectively configure the network.

Typically the controller at least one of:
a) selects a communicating station as a master station; and,
b) selects a direction of data transfer around at least one of the first and second communications rings.

Typically if selected as a master controller of a master station, the controller selectively deactivates at least one ring connection to thereby configure the network as an inline network.

Typically if selected as a master controller of a master station, the controller selectively deactivates a pair of first and second ring connections to thereby configure the network as an inline network.

Typically the master controller selectively deactivates at least one ring connection by at least one of:
a) disabling a ring port; and,
b) selectively controlling at least one switch.

Typically the controller selects a master controller by:
a) having the controller acquire identifiers of each other communicating station;
b) having the controller self elect as a master controller using the identifiers; and,
c) having the master controller communicate with controllers of each other communicating station to identify the master controller.

Typically the controller:
a) generates a configuration message the configuration message including an indication of a respective identifier;
b) transfers the configuration message to each adjacent communicating station;
c) receives configuration messages from adjacent communicating stations; and,
d) determines a network configuration using the configuration messages.

Typically:
a) if a received configuration message includes the respective identifier, the controller determines the network configuration; and,
b) if a received configuration message does not includes the respective identifier of the communicating station, the controller:
   i) adds the identifier of the communicating station to the configuration message; and,
   ii) transfers the configuration message to adjacent communicating stations.

Typically the controller:
a) periodically generates test messages; and,
b) detects a network fault using the test messages.

Typically the controller:
a) receives a test message from another communicating station; and
b) generates a response message; and,
c) transfers the response message to the other communicating station, each controller determining a network fault if a response from a communicating station is not received.

Typically the controller reconfigures the network in response to detection of a network fault.

Typically the controller reconfigures the network by at least one of:
a) selecting a new master station; and,
b) reversing a direction of data traffic flow.

Typically the communicating station includes a number of device ports for allowing communications devices to be coupled to the communicating station, the device ports providing connectivity to at least one switch.

Typically the communication device includes a controller capable of transforming data packets for transmission in accordance with different communications protocols.

Typically the protocols include:
a) Ethernet protocol;
b) a wireless transmission protocol; and,
c) a serial transmission protocol; and,
d) an analog signal for audio playback.

Typically the controller includes an electronic processing device.

Typically the communicating station connects to a power distribution ring to thereby power the communicating station.

Typically the communicating station includes a fuse for connecting electronic circuits to the power distribution ring.

Typically the communications rings are Ethernet rings and the first and second switches are Ethernet switches.

BRIEF DESCRIPTION OF THE DRAWINGS

An example of the present invention will now be described with reference to the accompanying drawings, in which:—

DETAILED DESCRIPTION OF THE PREFERRED EMBODIMENTS

Figure 1:
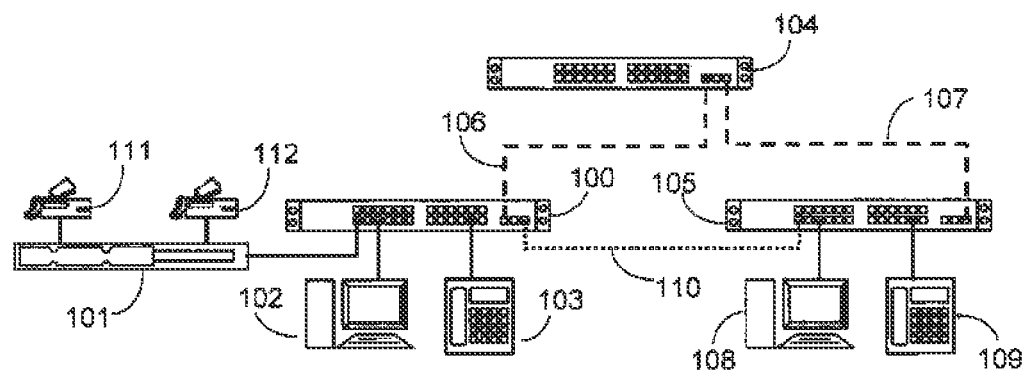
FIG. 1 is a schematic diagram of an example of a conventional communications network topology.

An example of a conventional Ethernet communications network topology will now be described with reference to FIG. 1.

In this example, the network includes a network Ethernet switch/router 100, IP gateway 101, data terminal 102 and IP phone 103 connected in a typical tree topology. The tree topology can be extended using multiple Ethernet switches/routers 100, 104, 105 connected together via Ethernet cables 106, 107, allowing further data terminals 108 and/or IP phones 109 to be connected to the switches/routers 104, 105, as shown. In this instance, data terminals 102, 108 can exchange data via the Ethernet switches/routers 100, 104, 105, with voice exchange being performed utilizing Voice-Over-Internet-Protocol (VoIP) technique begins between IP phones 103, 109.

Any other communication platforms, such as wireless radios 111, 112, can connect to the network via the IP gateway 101. Data terminals 102, 108 are able to exchange data packets with the wireless radios 111, 112 via the IP gateway 101. Likewise, IP phones 103, 109 may exchange voice packets with the wireless radios 111, 112 via the IP gateway 101.

The network size can be expanded by increasing the number of Ethernet switches/routers, data terminals, IP phones, IP gateways, connected in the tree topology.

In the event that a connection 110 is provided between the Ethernet switches/routers 100, 105, this results in the network having a loop configuration, which is generally undesirable. In particular, this leads to packets looping among the Ethernet switches/routers 100, 104, 105, which can in turn adversely affect network performance. To address this, standard protocols such as spanning-tree-protocol and rapid-spanning-tree-protocol deployed in most commercial Ethernet switch/routers detect and break such loops. However, the detection time to convergence of network range from 6 to 30 seconds depending on the scale of the tree topology.

Figure 2:
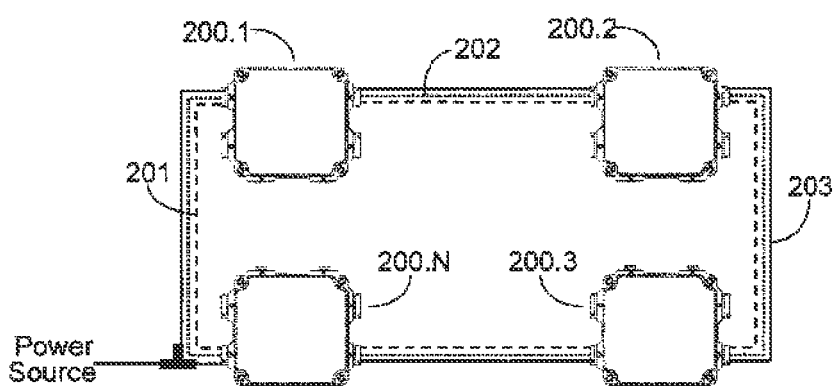
FIG. 2 is a schematic diagram of an example of communications network including a dual ring topology.

An example of a communications network using a dual ring topology will now be described with reference to FIG. 2.

In this example, the communications network includes a number of communicating stations 200.1, 200.2, 200.3 . . . 200.N, with each communicating station 200.1, 200.2, 200.3 . . . 200.N being connected to two adjacent communicating stations 200.1, 200.2, 200.3 . . . 200.N via respective pairs of first and second ring connections. Although four communicating stations 200.1, 200.2, 200.3 . . . 200.N are shown, this is for the purpose of illustration only and in practice any number of communicating stations can be used.

In any event, the first and second ring connections are arranged to define first and second Ethernet communication rings 201, 202, thereby interconnecting the plurality of communicating stations.

The use of first and second communication rings allows the network to be configured by the communicating stations to operate in a variety of ways. For example, the first and second communications rings can be operated separately, independently, or to provide at least one back-up communication ring. The first and second communications rings can be used for independently transporting voice traffic and data traffic or can be configured to operate as overlapping communications rings and provide transport media redundancy with one communications ring actively back up the other communications ring. Data traffic transported across one communications ring is also capable of being transported across the other communications ring when configured to operate as overlapping communications rings.

Additionally, the network can be dynamically reconfigured so that a faulty communicating station breaking the communication link does not affect the communication status between two or more other connected communicating stations. In one example, this can include having the network reconfigure as multiple isolated networks when two or more communicating stations are faulty. The network can also be adapted to automatically reconfigure when a communicating station recovers from a fault.

This allows the communications rings to be used to provide redundancy and automated self correction in the event of a fault, as well as allowing for separation of different types of data if required. Examples of this will be described in more detail below.

In addition to the ring connections, each communicating station 200.1, 200.2; 200.3 . . . 200.N can be connected to two adjacent communicating stations 200.1, 200.2, 200.3 . . . 200.N via an optional power distribution connection to thereby define a power distribution ring. This allows the communication stations 200.1, 200.2, 200.3 . . . 200.N to be powered via the network, as opposed to requiring separate power sources.

Figure 3:
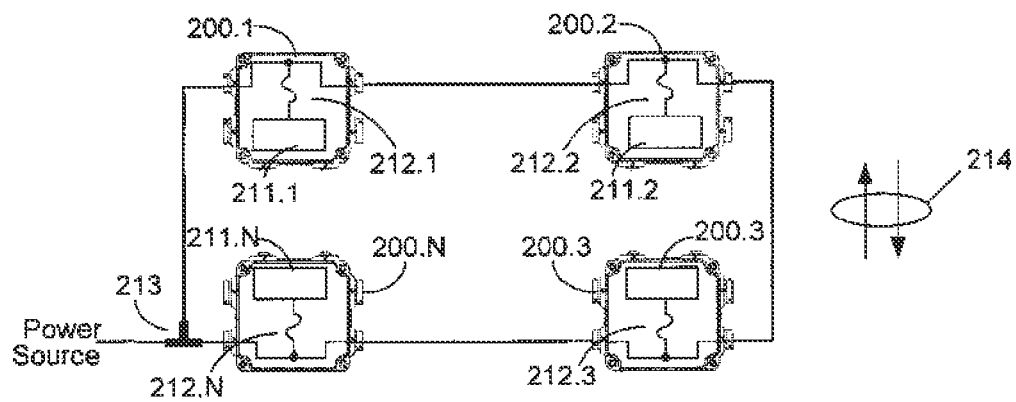
FIG. 3 is a schematic diagram of an example of power distribution among the communicating stations of the communications network of FIG. 2.

An example of a power distribution ring within the network will now be described with reference to FIG. 3.

In this example, a single external power source connects to a power distribution ring 203 via a T-joint terminal 213. Circuits 211.1, 211.2, 211.3 and 211.N in the respective communicating stations 200.1, 200.2, 200.3 and 200.N are protected with respective built-in fuse 212.1, 212.2, 212.3 and 212.N before taping power from the power distribution ring.

Faulty communicating stations drawing excessive current can trip the fuse 212 and isolate internal electronics from the power distribution ring. Thus, power is supplied continuously to the other healthy communicating station without power disruption. In the event that a segment is open-circuited, power distribution can be maintained flowing in the reverse direction, as shown by the arrows 214. This ensures that power distribution is maintained in a variety of failure situations.

A number of further features will now be described.

Each communicating station 200 typically includes first and second switches coupled to the first and second ring connections respectively, as well as a controller for controlling the switches and configuring the network, as will be described in more detail below. In one example, the first and second switches are selectively connectable, allowing data to be transferred between the communications rings. The controllers may also be capable of transforming data packets for transmission in accordance with different communications protocols, such as an Ethernet protocol, a wireless transmission protocol, a serial transmission protocol and an analog signal for audio playback.

Typically each communicating station includes at least two ring ports, which are typically Ethernet ports, for providing connectivity for a respective pair of first and second ring connections, and optionally the power ring. It will be appreciated that in one example, the first and second connections, and the power distribution connection can be provided in a single cable, thereby making setting up of the network straightforward.

Each communicating station also typically includes a number of device ports for allowing communications devices, such as a computer system, VoIP (Voice Over IP) phone, or the like to be coupled to the communicating station, and hence to the network.

Figure 4:
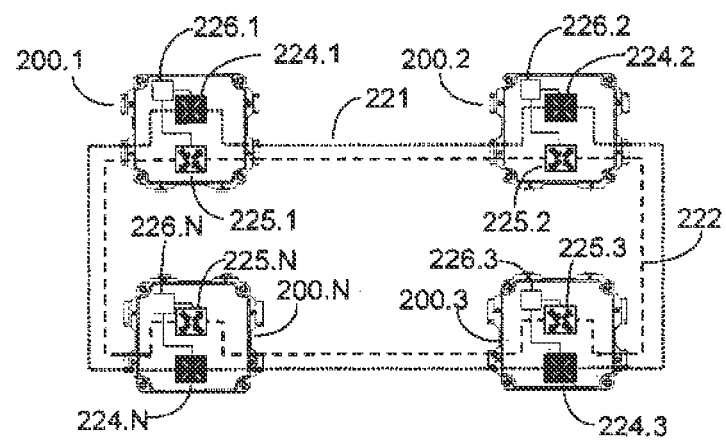
FIG. 4 is a schematic diagram of an example of Ethernet switches and dual rings of the communications network of FIG. 2.

An example of the internal structure of the communicating stations will now be described in more detail with reference to FIG. 4.

As shown, each communicating station 200.1, 200.2, 200.3 . . . 200.N includes dual Ethernet switches 224.1, 225.1, 224.2, 225.2, 224.3, 225.3 . . . 224.N, 225.N. Ethernet switches 224.1, 224.2, 224.3 . . . 224.N form the first Ethernet ring 221, whilst Ethernet switches 225.1, 225.2, 225.3 . . . 225.N form the second Ethernet ring 222, allowing IP packets to be transported within each ring.

The Ethernet switches are typically coupled to respective controllers 226.1, 226.2, 226.3 . . . 226N, which may include a processor executing instructions, for example in the form of software, allowing the switches to be controlled. Thus, the controllers 226 can be implemented using any suitably configured electronic processing device such as a microprocessor, microchip processor, firmware optionally associated with implementing logic such as an FPGA (Field Programmable Gate Array), or the like.

Whilst a single controller is shown in the above example, it will be appreciated that this may alternatively be implemented as multiple controllers, for example by having a respective controller associated with each switch 224, 225. It will also be appreciated that the Ethernet switches 224, 225 and the controllers 226 can form part of the circuits 211 mentioned above.

In use, the controllers 226 of the communicating stations can cooperate to configure the network. This may be performed in any suitable manner, however in one example, during an initial configuration phase, the controllers select a communicating station as a master station, with the master station then selecting a direction of data transfer around the first and second communications rings.

The controllers select a master controller by determining identifiers of the plurality of communicating stations and selecting a master station using the identifiers. In one example, this is achieved by having a controller of each communicating station acquire identifiers of each other communicating station. One of the controllers then self elects as a master controller using the identifiers, for example based on the communicating station having the highest identifier. The master controller then communicates with the controllers of each other communicating station to identify the master controller.

In one specific example, to achieve this, the controllers can generate a configuration message including an indication of a corresponding identifier, with the configuration message then being transferred to each adjacent communicating station. The controllers receive configuration messages from adjacent communicating stations and use these to determine a network configuration.

In particular, if a received configuration message by a controller does not include the corresponding identifier, this means the configuration message has not been passed around the entire ring, so the controller adds it's corresponding identifier to the configuration message and transfers the configuration message to adjacent communicating stations. Otherwise, once the configuration message has been passed around the entire ring, this allows the controllers to determine the relative position of the communicating stations on the rings and select a master station.

Following this, the controllers periodically generate test messages and detect a network fault using the test messages, for example, if a response from another communication station is not received in response to a test message being sent. When a fault is detected, the network can be automatically reconfigured, for example by selecting a new master station and reversing a direction of data traffic flow.

Examples of the operation of the controllers to configure the network will now be described in more detail with reference to FIGS. 5 to 8.

Initially the communicating stations 200 undergo a self-discovery phase to allow each communicating station to discover the identities and relative positions of the communicating stations on the Ethernet rings.

Upon power-up, intelligent software built-in the controller (not shown) sends an indication of an identity to the adjacent communicating stations, so for example, the communicating station 200.2 transfers a configuration message including it's own identity ID-2 to the communicating stations 200.1, 200.3. The identity can be any form of identifier that enables each communicating stations to be uniquely identified, such as an IP address, MAC address, or the like, with the indication typically being in the form of a suitably configured data packet.

Figure 5:
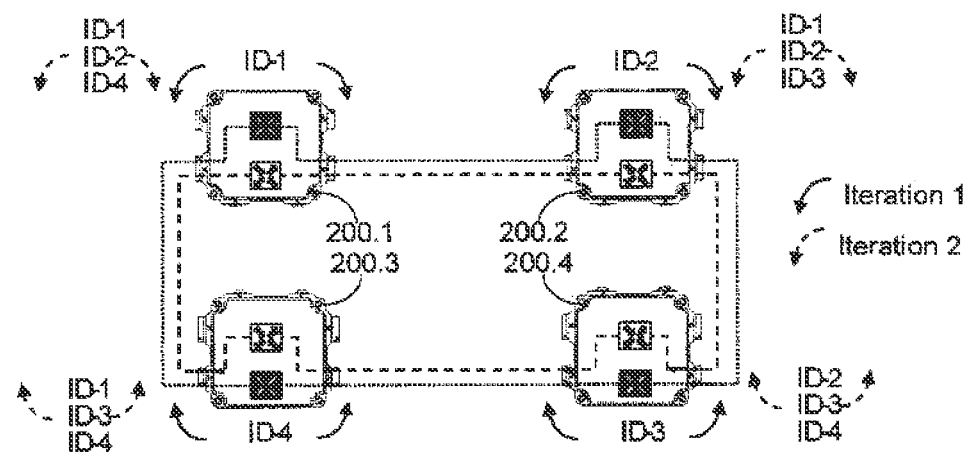
FIG. 5 is a schematic diagram of an example of communication between the communicating stations of FIG. 2 during a self-discovery phase.

The communicating stations receiving the message then append their own identity and transmit to the adjacent neighboring stations. This process continues, so that as the messages are passed round the ring, a list of identifiers representing the order of the communicating stations around the ring is constructed within the message. This continues until messages have been passed all communicating stations receive the identity of all other communicating stations, allowing the controller 236 of each communicating station 200 to determine the relative positions of each communicating station 200 within the Ethernet ring. An example of the above described self-discovery phase is shown in FIG. 5.

Following the self-discovery phase, the system enters self-electing phase to determine a master communicating station. The master communicating station 200 operates to control overall operation of the network, for example to determine a direction of travel for data packets on each of the first and second Ethernet rings. In one particular example, the identifier includes a numerical code, with the communicating station having a highest identity number being elected as the master. However, it will be appreciated that any suitable mechanism may be used.

In the current example, the communicating station 200.1 is elected as the master. Accordingly, the controller of the communicating master 200.1 disables the ring connections to the communicating station 200.N, for example by disabling the Ethernet ring port 235.1, thereby forcing data flowing in clockwise direction. As a result, the Ethernet rings are transformed into two inline networks automatically. This allows data packet transmission over an inline network, in accordance with suitable protocols, as will be appreciated by persons skilled in the art.

During network operation, the controller of each communicating station 200 will generate and send test messages through the inline network to detect for any change in network structure. This will typically be performed on a periodic basis, for example in accordance with instructions in the operating instructions. In one example, optional responses are sent by other communicating stations, to confirm the test message has been received. In the event that a communicating station is faulty, or another break in the inline Ethernet ring exists, the fault is detected due to failure in contacting the faulty station 200.

Figure 7:
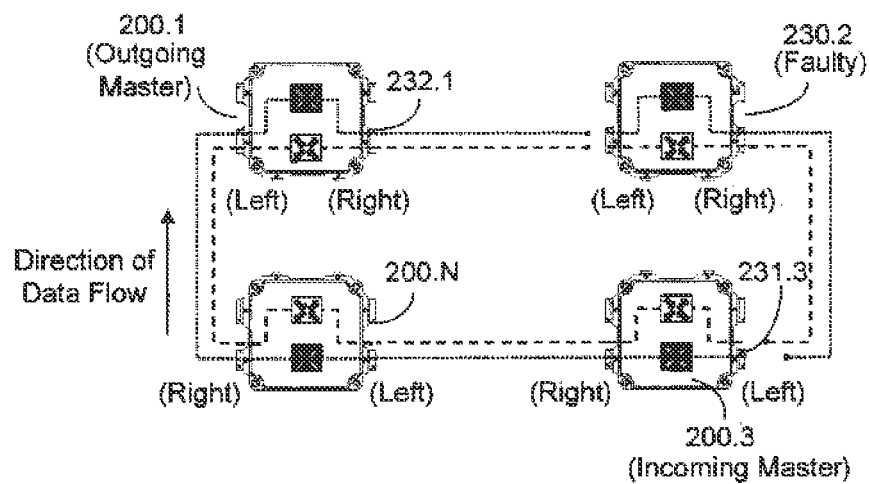
FIG. 7 is a schematic diagram of an example of the communications network of FIG. 2 in a self-healed configuration.

An example of network response to a faulty communicating station is shown in FIG. 7.

In this example, the communicating station 200.2 is faulty, which is identified by the controllers of the communicating station 200.1 (outgoing self-elected master) and the communicating station 200.3 through a loss of connectivity with the faulty station 200.2, for example through failure to receive a response to the test messages, thereby triggering a self-healing phase.

Figure 6:
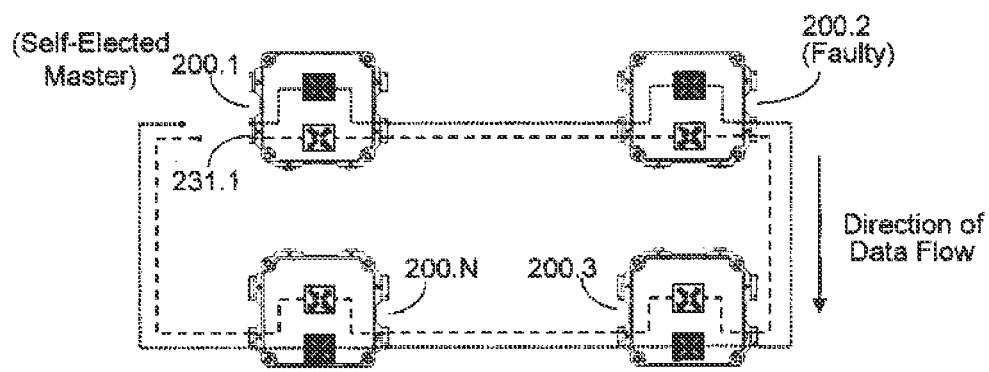
FIG. 6 is a schematic diagram of an example of the communications network of FIG. 2 configured to provide an inline network structure.

In particular, the communicating stations 200.1, 200.3 determine that connectivity via the right and left ring ports 232.1, 231.3 has been lost. In the current protocol, the self-elected master communicating station always stops traffic passing through the left ring port for configuring the ring into inline topology as illustrated in FIG. 6. Accordingly, in this example, the controller of the communicating station 200.3 assumes the master role from the communicating station 200.1. Data traffic direction is maintained with the communicating station 200.3 disconnecting the Ethernet ring into inline topology by disabling communication via the left ring port 231.3.

It will be appreciated that in this example, each of the communicating stations 200.1, 200.3 can each determine the same outcome based on rules, without requiring communication therebetween, thereby allowing different communicating stations to reconfigure the network even in the event that the fault prevents the communicating stations from communicating.

Figure 8:
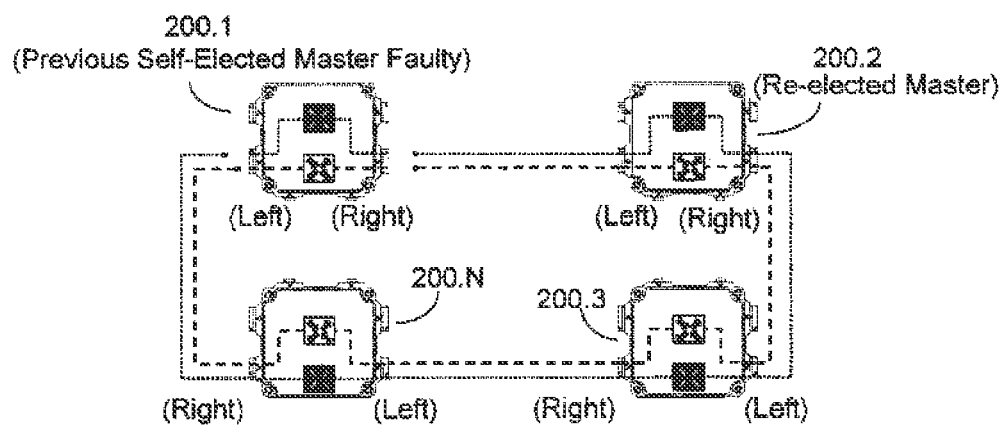
FIG. 8 is a schematic diagram of an example of the communications network of FIG. 2 with a faulty master communicating station.

In an example illustrated in FIG. 8, a self-elected master communicating station is faulty. In this instance, and in a manner similar to that described above, the surviving communicating stations trigger a self-healing phase. As a result, the communicating station 200.2 is re-elected as the system master upon detecting loss of communication link at its left port.

In another embodiment the faulty communicating station recovers and being re-administrated into the network without system reboot or operator intervention. Existing elected master retains role since its left connectivity has already disabled and data traffic is not disturbed upon re-administrating a recovered communicating station.

Figure 9:
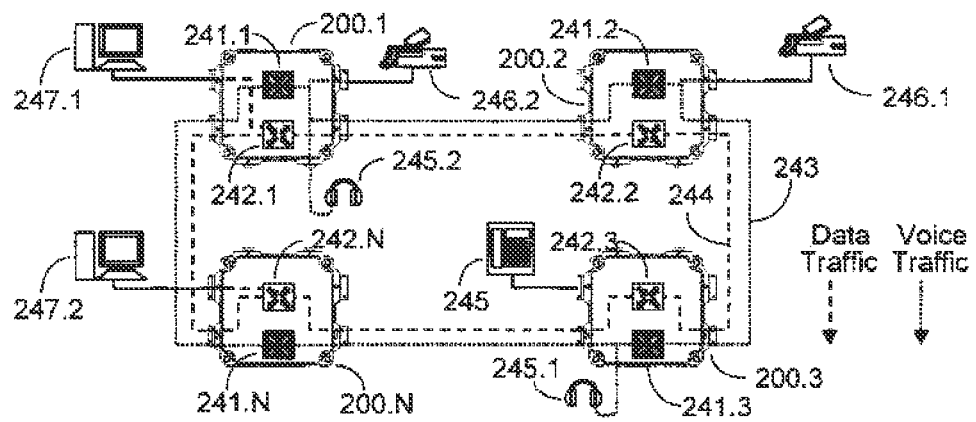
FIG. 9 is a schematic diagram of an example of the communications network of FIG. 2 configured to support separated voice and data services.

An example usage of the above described communications network arrangement will now be described with reference to FIG. 9.

In this example, the communications network includes a number of communicating stations 200.1, 200.2, 200.3 . . . 200.N, each including respective Ethernet switches 241.1, 242.1, 241.2, 242.2, 241.3, 242.3 . . . 241.N, 242.N. The Ethernet switches 241, 242 are interconnected as described in the above examples, to thereby define first and second Ethernet rings 243, 244. A power distribution ring is not shown in this example, for clarity purposes only.

In this example, the Ethernet rings 243, 244 are used to host concurrent voice and data services respectively, so that voice and data traffic is transferred independently on the separate Ethernet rings. As a result, voice traffic on one Ethernet ring does not interfere data traffic on the other Ethernet ring, thereby helping maintain quality of service for both voice and data transfer.

Accordingly, a data terminal 247.1, coupled to the communicating station 200.1 via a respective device port, can exchange Ethernet packets with a data terminal 247.2 coupled to the communicating station 200.N. In this example, with the communicating station 200.1 configured as the master station, as described above with respect to FIG. 6, data packets from the data terminal 247.1 are transferred to the data terminal 247.2 via the Ethernet switches 242.1, 242.2, 242.3 . . . 242.N in the communicating stations 200.1, 200.2, 200.3 . . . 200.N.

Voice services can be provided via any appropriate equipment, for example, using headsets 245.1, 245.2 coupled to the communicating stations 200.1, 200.3 via respective device ports. In this example, voice services are exchanged between communicating stations using the Ethernet switches 241.1, 241.2, 241.3 . . . 241.N, as required, so with the communicating station 200.1 being configured as the master, communication between the headsets 245.1, 245.2 is via the Ethernet switches 241.1, 241.2, 241.3 on the first Ethernet ring 243.

In another example, an operator using headset 245.1 can communicate with external communication platforms via an analog voice path through wireless radio 246.2 attached to communicating station 200.1. Audio paths between two or multiple wireless radios 246.1, 246.2 attached to the communicating stations 200.1, 200.2 can also be used to allow operators to communicate wirelessly, enabling two or more external disparate communication platforms to interoperate.

In a further example, a VoIP (Voice Over IP) phone 245.1, 245.2, coupled to the communicating stations 200.1, 200.3 can be used to call and communicate with any other operator, other VoIP phone and wireless radio attached to any other communicating stations.

Thus, voice communicating devices such as headsets, VoIP phones and wireless radios can be attached to the communicating stations 200, allowing the communicating device to establish connectivity with, and hence exchange voice messages with the other communicating devices, via the built-in Ethernet switches in the respective communicating station 200.1, 200.2, 200.3 and 200.N.

A second example usage of the above described communications network arrangement will now be described with reference to FIG. 10.

In this example, the communications network includes a number of communicating stations 200.1, 200.2, 200.3 . . . 200.N, each including respective Ethernet switches 251.1, 252.1, 251.2, 252.2, 251.3, 252.3 . . . 251.N, 252.N. The Ethernet switches 251, 252 are interconnected as described in the above examples, to thereby define first and second Ethernet rings 253, 254. A power distribution ring is not shown in this example, for clarity purposes only.

However, in this example, a communication path is provided between the Ethernet switches 251.1 and 252.1, 251.2 and 252.2, 251.3 and 252.3, . . . 251.N and 252.N in each of the communicating stations 200.1, 200.2, 200.3 . . . 200.N. By interconnecting the Ethernet switches, this allows the network topology to transform into two overlapping Ethernet rings. The dual Ethernet rings overlap and provide integrated voice and data services, with network survivability being further enhanced by allowing the Ethernet rings 253, 254 to act as mutual back ups to each other.

As will be appreciated by persons skilled in the art, the communication path between the Ethernet switches 251, 252 can be selectively controlled, by the respective controllers (not shown), thereby allowing a range of different network configurations to be implemented. Thus, the network can be selectively switched from separate independent rings, to back-up or connected rings, as required.

Figure 10:
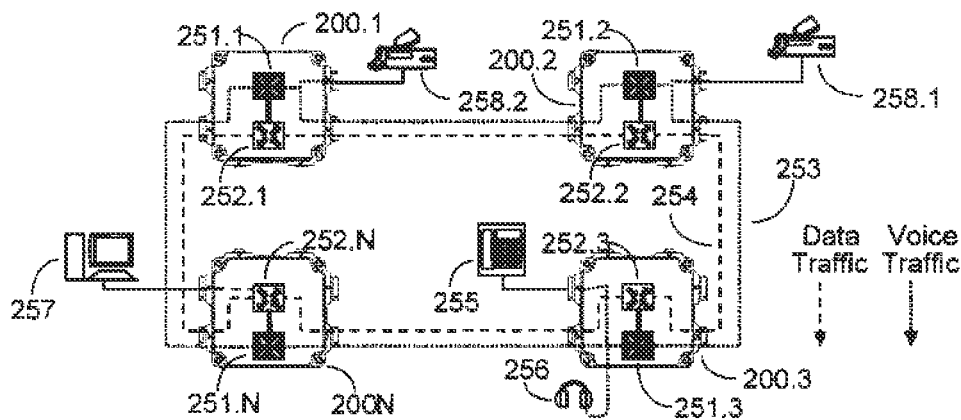
FIG. 10 is a schematic diagram of an example of the communications network of FIG. 2 configured to support integrated voice and data services; and, FIG. 11 is a schematic diagram of an example of the communications network of FIG. 2 with multiple faulty communicating stations.

In the example of FIG. 10, integrated voice and data services can be provided. For example, a VoIP phone 255 coupled to the communicating station 200.3 can communicate with a software implemented VoIP phone installed in a data terminal 257, coupled to the communicating station 200.N. In this example, communication would be achieved via Ethernet switches 251.3, 251.N, 252.N.

In another example, the data terminal 257 can be used to communicate via a wireless radio 258.1, coupled to the communicating station 200.2. In this example, data packets from data terminal 257 transverse through the Ethernet switches 252.N, 252.1, 252.2 before reaching the Ethernet switch 251.2. The controller (not shown) in the communicating station 251.2 can include a processor for trans-coding the Ethernet packets into another suitable form of serial communicating media, allowing this to be transferred to the wireless radio 258.1, for over-the-air transmission.

In a further example, a software VoIP phone installed in the data terminal 257 can exchange voice messages with wireless radio 258.2, coupled to the communicating station 200.1, via the Ethernet switches 252.N, 252.1, 251.1. VoIP packets from data terminal 257 are transformed into analog voice by the controller (not shown) of communicating station 200.1 before over-the-air transmission via wireless radio 258.2.

Figure 11:
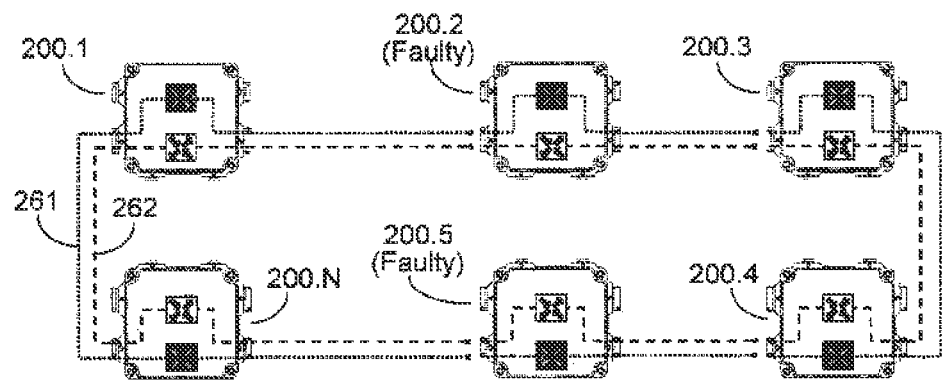

An example of the network configuration when two or more communicating stations are faulty will now be described with reference to FIG. 11.

In this example, communicating stations 200.1, 200.2, 200.3, 200.4, 200.5 . . . 200.N are connected via respective first and second Ethernet rings 261, 262. In this example, if the communicating stations 200.2, 200.5 are faulty, this results in two isolated inline networks, with the first network being formed by communicating stations 200.1 and 200.N, and second network being formed by communicating stations 200.3 and 200.4. Communication is maintained among the communicating stations within the survived sub-networks. When either of the faulty communicating stations recovered, the two isolated networks are re-joined to original communication status without system power cycle or operator intervention.

Accordingly, the above described network arrangement uses configurable dual Ethernet rings to interconnect communicating stations, thereby allowing a range of different network configurations to be implemented.

In particular, the above described arrangement uses a ring topology including a closed network path as opposed to a more traditional tree topology. To further enhance the network survivability, an additional ring is added into the topology. Each of the communicating stations can be equipped with a variety of connectivity, for example using suitable data or voice communications devices, assisting operators in voice and/or data communication. The communicating stations can also functions as a network access node to the dual Ethernet rings infrastructure thereby further eliminating the need for additional network equipment such as separate Ethernet Switches/Hubs.

In a further example, a power distribution ring is incorporated with the dual Ethernet rings routed between adjacent communicating stations. External power source connects to the power ring distribution for powering all the attached communicating stations. Each of the communicating stations can be equipped with a built-in self-healing fuse, such as a circuit breaker, allowing the communicating station to safely utilise power from the power distribution ring. In the event that a fault occurs with a communicating station, the fuse is triggered its internal fuse to isolate from the power distribution ring without affecting other communicating stations, thereby improving the survivability of the system in addition to the dual Ethernet rings infrastructure.

Link redundancy is achieved for both the Ethernet connectivity and power supply, thereby allowing the communicating stations to be powered via the network connections.

The communicating stations typically include controllers implementing software based instructions, allowing the communicating stations and in particular Ethernet switches incorporated therein to be configured as required. This allows the communicating stations to function as part of the dual Ethernet rings infrastructure for self-discovery, self-configuration and self-healing improving the converging time as compared to standard protocols.

In particular, the software is implemented within each communicating station, allowing the communicating stations to perform the following automatically upon power-up:
Self-discovery of the other communicating station within the dual ring infrastructure;
Self-electing a master to "breaking" the ring into inline topology for data transmission and prevent infinite looping of packets;
Self-monitoring of the system link state;
Self-healing of the communication link when failure is detected.

An optional external management system can also communicates with each communicating stations specifying the static system configuration upon power up and policy in managing the dynamic usage of the communication infrastructure.

The communicating stations can function as a network access node to participate in the dual Ethernet rings, with each communicating station also be equippable with audio connectivity, radio connectivity and data terminal connectivity to support exchange of voice and/or data messages converted into IP packets with other communicating station attached to the Ethernet rings infrastructure.

For example, an operator can attach external communication equipment and/or accessories to the communicating station. The communicating station converts the data and/or voice messages transmits by the operator into IP packets to exchange with other intended communicating station via the Ethernet ring infrastructure. The arrangement can also be used to support various forms of communication modes for voice and data traffics, such as:
Point-to-point communication;
Point-to-multipoint communication;
Broadcasting;
Inter-Ethernet ring communication.

As a result, the communicating stations can offer a variety of voice, data and control services, but not limited, to the following:
Selective party for point-to-point voice call;
Conference voice call among a group of participating communicating station;
Patching of 2 radios within the communicating station to support interoperability of different make and type of radios;
Coupling of 2 radios between 2 communicating stations to support interoperability of different make and type of radios;
Radio conferencing among different make and type of radios attached at the various communicating station on the Ethernet ring network;
Control of radio parameters such as frequency, power, etc;
Data exchange between 2 or more data terminals attached at the various communicating station on the Ethernet ring network;
Function as IP gateway to facilitates exchange of messages between 2 or more non-IP equipment.

The usage of the dual Ethernet rings is software configurable to separate voice ring and data ring for different types of data traffics and ensuring quality of service, or alternatively to integrate voice and data traffics in one ring while the other functions as active redundant link. The above described network can therefore be used to provide dual Ethernet rings for transporting voice and data traffics in different rings or to provide integrated voice and data transmission in one ring whilst the other ring functions as active redundant link.

Whilst the above described examples have focussed on the use of a dual ring network, it will be appreciated that the above described techniques could also be used on a network including only a single communications ring. In this instance, each communicating station need only include a single switch coupled to ring connections for connection to two adjacent communicating stations. Even though only a single communications ring is used, it will be appreciated that the majority of the above described configuration and self healing techniques, such as reconfiguration of the communications ring into an inline network, and the re-election of a master communications station upon detection of a fault within the network, can still be used.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A communications network comprising:
a plurality of communicating stations, each communicating station being connectable to two adjacent communicating stations via respective ring connections, the ring connections being arranged to define at least one communications ring interconnecting the plurality of communicating stations,
wherein the network is adapted to at least partially reconfigure the ring connections in response to detection of at least one network fault,
wherein each of the plurality of communicating stations comprises a controller, each controller being operative to cooperate with other controllers to selectively configure the network, and
wherein at least one controller is operative to perform at least one of:
a) selects a communicating station as a master station;
b) selects a direction of data transfer around at least one communications ring;
c) selectively deactivates at least one ring connection to thereby configure the network as an inline network; and
d) tests the integrity of at least one ring by one of:
i) periodically generating test messages and detecting a network fault using the test messages, and
ii) receiving a test message from another communicating station, generating a response message, and transferring the response message to the other communicating station, each controller determining a network fault if a response from a communicating station is not received.

2. The communications network according to claim 1, wherein each communicating station is selectively connectable to two adjacent communicating stations via respective pairs of first and second ring connections, the first and second ring connections being arranged to define first and second communications rings interconnecting the plurality of communicating stations, the communications network being adapted to at least partially reconfigure at least one of the first and second ring connections in response to detection of at least one network fault.

3. The communications network according to claim 1, wherein a master controller selectively deactivates at least one ring connection by at least one of:
   a) disabling a ring port of a communicating station; and
   b) selectively controlling at least one switch of a master station.

4. The communications network according to claim 1,
   wherein each communicating station includes a controller for controlling operation of the communicating station, and
   wherein each communicating station includes at least one switch coupled to the ring connections, said at least one switch comprising at least one of:
      a) a first switch coupled to first ring connections; and,
      b) a second switch coupled to second ring connections,
   wherein the controller controls operation of the first and second switches.

5. The communications network according to claim 4, wherein each communicating station includes a number of device ports for allowing communications devices to be coupled to the communicating station, the device ports providing connectivity to at least one switch.

6. The communications network according to claim 4, wherein each controller is capable of transforming data packets for transmission in accordance with different communications protocols.

7. The communications network according to claim 1, wherein the network includes first and second communications rings configured to operate at least one of:
   a. separately;
   b. independently; and,
   c. as at least one back-up communications ring,
   wherein the first and second communications rings are operative to independently transporting voice traffic and data traffic.

8. The communications network according to claim 1, wherein the network includes first and second communications rings configured to, at least one of:
   a) operate as overlapping communications rings and provide transport media redundancy with one communications ring actively back up the other communications ring, and
   b) transport data traffic, which is being transported across one communications ring, across the other communications ring when configured to operate as overlapping communications rings.

9. The communications network according to claim 1, wherein the network configures at least one of:
   a) a faulty communicating station breaking the communication link does not affect the communication status between two or more other connected communicating stations,
   b) the network configures as multiple isolated networks when two or more communicating stations are faulty, and
   c) the network reconfigures upon a communicating station recovering from a fault.

10. The communications network according to claim 1 wherein each communicating station has a power connection which, when coupled together, form a power ring, each communicating station being equipped with self-healing fuse whereby electronics fault affecting one communicating station will not cause power interruption to said adjacent communicating stations.

11. A communications network comprising:
    a plurality of communicating stations, each communicating station being connectable to two adjacent communicating stations via respective ring connections, the ring connections being arranged to define at least one communications ring interconnecting the plurality of communicating stations,
    wherein the network is adapted to at least partially reconfigure the ring connections in response to detection of at least one network fault,
    wherein each of the plurality of communicating stations comprises a controller, each controller being operative to cooperate with other controllers to selectively configure the network, and
    wherein a master controller is selected by:
       a) having a controller of each communicating station acquire identifiers of each other communicating station;
       b) having a controller self-elect as a master controller using the identifiers; and,
       c) having the master controller communicate with the controller of each other communicating station to identify the master controller.

12. The communications network according to claim 11, wherein at least one controller:
    d) generates a configuration message the configuration message including an indication of a respective identifier;
    e) transfers the configuration message to each adjacent communicating station;
    f) receives configuration messages from adjacent communicating stations; and,
    g) determines a network configuration using the configuration messages.

13. The communications network according to claim 12, wherein for each controller:
    h) if a received configuration message includes the respective identifier, the controller determines the network configuration; and,
    i) if a received configuration message does not includes the respective identifier of the communicating station, the controller:
       i. adds the identifier of the communicating station to the configuration message; and,
       ii. transfers the configuration message to adjacent communicating stations.

14. A communicating station for use in a communications network including a plurality of communicating stations provided in a ring architecture, the communicating station being selectively connectable to two adjacent communicating stations via respective ring connections, the ring connections being arranged to define at least one communications ring interconnecting the plurality of communicating stations, the communication station including:
    a) a switch coupled to the ring connections; and
    b) a controller to control operation of the switch to thereby at least partially configure the ring connections in response to at least one network fault,
    wherein the controller cooperates with controllers of the plurality of communicating stations to selectively configure the network, and
    wherein the controller selects a master controller by:
       c) having the controller self-elect as a master controller using the identifiers; and, d) having the master controller communicate with controllers of each other communicating station to identify the master controller.

15. The communicating station according to claim 14, wherein the communication station is selectively connectable to two adjacent communicating stations via respective pairs of first and second ring connections, the first and second ring connections being arranged to define first and second communications rings interconnecting the plurality of communicating stations, the communication station including:
   a) a first switch coupled to the first ring connections; and,
   b) a second switch coupled to the second ring connections, wherein the controller controls operation of the first and second switches to thereby at least partially configure the first and second ring connections.

16. The communicating station according to claim 15, wherein each communicating station includes at least two ring ports, each ring port providing connectivity for a respective pair of first and second ring connections.

17. The communicating station according to claim 16, wherein each ring port provides connectivity between the first and second ring connections and the first and second switches respectively.

18. The communicating station according to claim 14, wherein the controller:
   e) generates a configuration message the configuration message including an indication of a respective identifier;
   f) transfers the configuration message to each adjacent communicating station;
   g) receives configuration messages from adjacent communicating stations; and,
   h) determines a network configuration using the configuration messages.

19. The communicating station according to claim 18, wherein:
   i) if a received configuration message includes the respective identifier, the controller determines the network configuration; and,
   j) if a received configuration message does not includes the respective identifier of the communicating station, the controller:
      i) adds the identifier of the communicating station to the configuration message; and
      ii) transfers the configuration message to adjacent communicating stations.

20. The communicating station according to claim 14, said communicating station comprising a power connection that, together with power connections in said communicating adjacent stations, forms a power ring, said communicating station being equipped with a self-healing fuse whereby electronics fault affecting said communicating station will not cause power interruption to said adjacent communicating stations.

* * * * *

UNITED STATES PATENT AND TRADEMARK OFFICE
CERTIFICATE OF CORRECTION

PATENT NO. : 9,450,808 B2  
APPLICATION NO. : 14/131324  
DATED : September 20, 2016  
INVENTOR(S) : Chin Kang Lee et al.

Page 1 of 1

It is certified that error appears in the above-identified patent and that said Letters Patent is hereby corrected as shown below:

In the Claims

Column 16, Line 29: In Claim 12, delete "d)" and insert --a)--

Column 16, Line 32: In Claim 12, delete "e)" and insert --b)--

Column 16, Line 34: In Claim 12, delete "f)" and insert --c)--

Column 16, Line 36: In Claim 12, delete "g)" and insert --d)--

Column 16, Line 40: In Claim 13, delete "h)" and insert --a)--

Column 16, Line 43: In Claim 13, delete "i)" and insert --b)--

Column 17, Line 26: In Claim 18, delete "e)" and insert --a)--

Column 18, Line 1: In Claim 18, delete "f)" and insert --b)--

Column 18, Line 3: In Claim 18, delete "g)" and insert --c)--

Column 18, Line 5: In Claim 18, delete "h)" and insert --d)--

Column 19, Line 9: In Claim 19, delete "i)" and insert --a)--

Column 19, Line 12: In Claim 19, delete "j)" and insert --b)--

Signed and Sealed this  
Tenth Day of January, 2017

Michelle K. Lee  
*Director of the United States Patent and Trademark Office*